July 11, 1950  E. H. PARNELL, SR  2,515,018
FISHING LURE
Filed Jan. 8, 1947
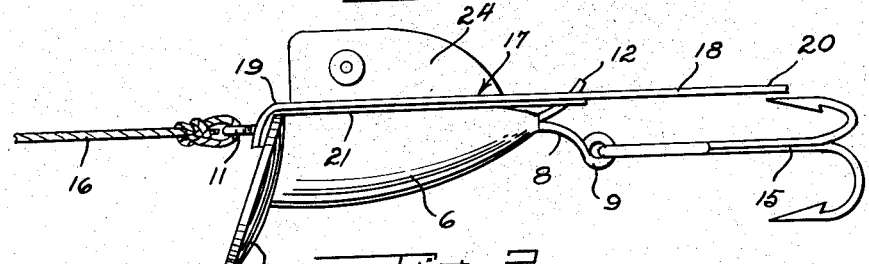
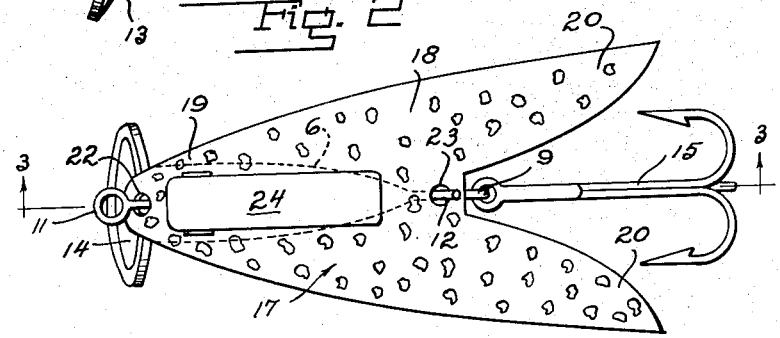
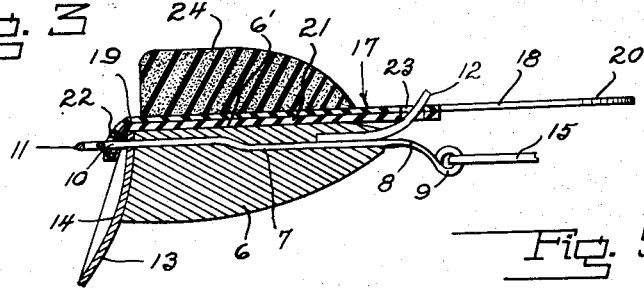
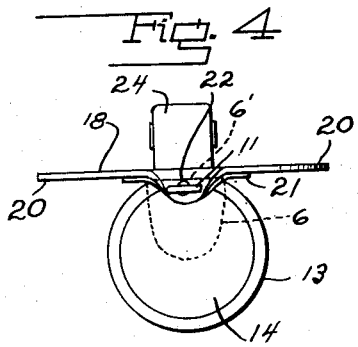
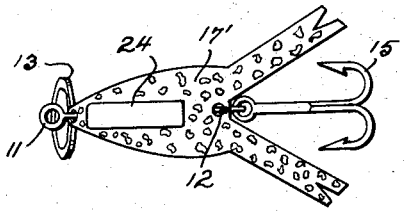
Inventor
E. H. Parnell, Sr.
By
Attorney Patented July 11, 1950

2,515,018

UNITED STATES PATENT OFFICE 2,515,018

FISHING LURE

Edwin H. Parnell, Sr., Greenville, S. C., assignor of forty-nine per cent to Oliver C. Williams, Greenville, S. C.

Application January 8, 1947, Serial No. 720,739

1 Claim. (Cl. 43—42.28)

My invention relates to a casting and trolling lure.

An important object of my invention is to provide a casting and trolling lure which is so constructed that the live bait simulating member may be readily attached to and removed from the body portion provided with a hook, thereby permitting the alternate use of any number of bait simulating members of different shapes, sizes, and colors.

A further object of the invention is to provide a device of the above mentioned character, wherein the live bait simulating member may be attached to and removed from the body portion or weight, without necessitating the removing or handling of the fish hook.

A further object of the invention is to provide a casting and trolling lure which has a swimming motion while being trolled, thereby simulating the movements of a live bait.

A still further object of the invention is to provide a device of the character mentioned, which is extremely simple in construction, comprising few parts, and which will be inexpensive to manufacture.

Other objects and advantages of the invention will be apparent during the course of the following description.

In the accompanying drawings, forming a part of this application, and in which like numerals are employed to designate like parts throughout the same, Figure 1 is a side elevation of the casting and trolling lure embodying my invention, drawn on an enlarged scale, Figure 2 is an enlarged plan view of the same, Figure 3 is a central vertical longitudinal section taken substantially on line 3—3 of Figure 2, Figure 4 is an enlarged front end elevation of the device, and, Figure 5 is a plan view of the device employing a live bait simulating member of a different shape and color.

In the drawings, where for the purpose of illustration, are shown preferred embodiments of my invention, the numeral 6 designates the body portion or weight of a fishing lure, and this body portion is longitudinally elongated and tapered rearwardly. The body portion or weight 6 may be formed of any suitable material such as cast iron or lead. Cast or embedded within the body portion 6 and rigidly secured therein is a longitudinal rod or shank 7, disposed near the flat top 6' of the body portion. This rod 7 includes a rear curved extension 8 which extends longitudinally rearwardly of and downwardly from the rear end of the body portion 6, and terminates in a rear loop or eye 9. The longitudinal rod 7 also includes a forward straight longitudinal extension 10, terminating in a forward loop or eye 11. Also embedded or cast within the body portion 6, at the rear end of the same, and extending rearwardly longitudinaly of and upwardly from the body portion is a curved pin or keeper 12, for a purpose to be described. Rigidly secured to the forward end of the body portion 6, by means of soldering, welding, or the like, is a rigid depending circular cup-shaped disc 13, which is arranged rearwardly of and near the forward eye 11. This disc 13 extends downwardly beneath the body portion 6 and it is inclined forwardly, toward its lower end. If desired, the disc 13 may be cast integral with the body portion 6. The forward end of the rod 7 passes through the disc. This cup-shaped disc 13 has its concave face 14 arranged forwardly. The cup-shaped disc causes the lure to wiggle with a right and left lateral movement, thus simulating the life-like motions of a live bait swimming through the water, such as the motion of a fly, bug, fish, frog, or the like. The disc 13 also simulates the mouth or bill of a live bait. The numeral 15 designates a suitable fishhook, which is preferably of the triple or treble type. The hook 15 has a free swivel connection with the rear loop or eye 9 and is permanently connected thereto. A fishing line 16 is fastened to the forward loop or eye 11 when the lure is being used.

The numeral 17 designates a live bait simulating member, which is flexible and resilient, and which may be formed of suitable material such as rubber, flexible plastics, or the like. The member 17 comprises an upper sheet 18, which is cut into the general shape of a fly. The forward portion 19 of the sheet 18 constitutes the body portion of the fly, and the rear portions 20 constitute the wings. A second and lower sheet 21 is arranged beneath the sheet 18, and cemented or otherwise securely attached thereto. This lower sheet 21 extends from the forward end of the sheet 18 to the forward ends of the wing portions 17, and these assembled sheets are provided near their forward ends with an opening 22, which is smaller than the diameter of the forward eye 11. The assembled sheets 18 and 21 are provided with a small opening 23, near the rear end of the sheet 21, and the openings 22 and 23 are spaced longitudinally and are at the transverse center of the lure. Secured to the upper sheet 18 of the live bait simulating member 17 by means of cementing, or the like, is a live bait head simulating member 24, preferably formed of sponge rubber or the like. This head member 24 is located centrally upon the bait simulating member 17.

To attach the bait simulating member 17 to the body portion or weight 6, the member 17 is held in one hand with the head 24 projecting upwardly; and the depending disc 13 is held in the other hand. The loop or eye 11 is passed through the forward opening 22, and this smaller opening receives the eye 11 due to its resiliency. The bait simulating member is now stretched longitudinally rearwardly, and the curved pin 12 is introduced into the rear opening 23. The assembled parts now assume their relative positions shown in Figure 1 of the drawings. In the assembled position, the forward end of the bait simulating member 17 is flexed laterally downwardly, and is secured between the forward eye 11 and the front side of the depending disc 13. The bait simulating member 17 may be of light color, such as tan or cream, with suitable striping or spotted coloring. The head member 21 may be provided with beads or the like, to simulate the eyes of a live bait.

In Figure 5 a bait simulating member 17' is provided, which is substantially identical with the member 17, except that it is cut or shaped to simulate a frog. This member 17' may be colored as desired, and may be formed in any desired shape to simulate various baits. All other parts of the device as illustrated by Figure 5 are identical with those shown and described in Figures 1 to 4.

It is thus seen that I have provided a device wherein a change may be made from one bait simulating member to another, providing different color or colors, in order to find out what color object the fish will take. As is well known, fish may strike an object of one color when the water is clear, but when the water is muddy, they will strike an object of another color. The difference in light intensity on a bright day, from that on a cloudy day makes a considerable difference in the color of the object to be used.

During trolling, the lure swims beneath the water, and is held beneath by the inclined cup-shaped disc 13, which produces the wiggling motion, while maintaining the device in an upright position. The forward end of the bait simulating member 17 is disposed in advance of the disc 13 and engages therewith, as stated before. The disc serves as a stop to limit the rearward movement of the member 17 with respect to the body portion 6, which would be caused by the rearward pressure of the water upon the member 17 during trolling. Further, the disc 13 holds the member 17 against turning movement to any considerable extent, upon its longitudinal axis, with relation to the body portion 6.

It is to be understood that the forms of my invention herewith shown and described are to be taken as preferred examples of the same, and that various changes in the shape, size, and arrangement of parts may be resorted to, without departing from the spirit of my invention or the scope of the subjoined claim.

Having thus described my invention, what I claim is:

A bait casting and trolling lure, comprising an elongated weight body portion, a transverse disc secured to the forward end of the weight body portion and stationary with relation thereto and having its lower end projecting downwardly below the weight body portion and its top terminating generally at the top of the weight body portion, the disc having a substantially concave front face, a forward extension disposed in advance of the disc and having an eye and secured to the weight body portion, the forward extension being arranged below the top of the weight body portion and the top of the disc, a rear extension carried by the weight body portion and having its free end terminating near and above the top of the weight body portion, the free end of the rear extension facing rearwardly, a flexible and longitudinally elastic bait simulating member disposed upon the top of the weight body portion, the bait simulating member having a forward thick portion provided near its opposite ends with openings and rearwardly extending thin portions having a greater degree of flexibility than the thick portion, the thick portion extending throughout the entire length of the weight body portion and the forward opening receiving the forward extension and the rear opening receiving the rear extension, an eye secured to the rear end of the weight body portion and spaced downwardly from the top of the weight body portion, and a hook separate from the rear extension and bait simulating member and freely pivotally mounted upon the eye.

EDWIN H. PARNELL, Sr.

REFERENCES CITED

The following references are of record in the file of this patent:

UNITED STATES PATENTS

| Number | Name | Date |
|---|---|---|
| 1,264,627 | Foss | Apr. 30, 1918 |
| 1,334,249 | Lane | Mar. 16, 1920 |
| 1,440,869 | Foss | Jan. 2, 1923 |
| 1,535,957 | Stanley et al. | Apr. 28, 1925 |
| 1,742,786 | Roberts | Jan. 7, 1930 |
| 1,870,767 | Brown | Aug. 9, 1932 |
| 1,993,018 | Pfeifle | Mar. 5, 1935 |